United States Patent [19]

Reinke

[11] Patent Number: 4,470,911

[45] Date of Patent: Sep. 11, 1984

[54] MICROCOMPUTER CONTROLLED DEMAND/SCHEDULED WATER SOFTENER WITH VARIABLE CAPACITY

[75] Inventor: John F. Reinke, Greendale, Wis.

[73] Assignee: Autotrol Corporation, Milwaukee, Wis.

[21] Appl. No.: 540,809

[22] Filed: Oct. 11, 1983

[51] Int. Cl.³ ............................................. B01J 49/00
[52] U.S. Cl. ..................................... 210/662; 210/89; 210/98; 210/140; 210/143; 364/502
[58] Field of Search ................ 210/662, 670, 687, 89, 210/98, 102, 103, 109, 140, 143, 190, 191, 269; 364/500, 502

[56] References Cited

U.S. PATENT DOCUMENTS

| | | | |
|---|---|---|---|
| 4,104,158 | 8/1978 | Davis | 210/662 |
| 4,237,538 | 12/1980 | Le Dall | 364/500 |
| 4,275,448 | 6/1981 | Le Dall | 364/500 |
| 4,385,357 | 5/1983 | Davis et al. | 364/500 |

FOREIGN PATENT DOCUMENTS

| | | |
|---|---|---|
| 1450222 | 9/1976 | United Kingdom . |
| 2031614A | 4/1980 | United Kingdom . |
| 1599706 | 10/1981 | United Kingdom . |

OTHER PUBLICATIONS

"Comput-A-Save System—Operation and Installation Guide" by Water Refining Company, Inc., Jul. 1, 1978.
Sales Literature—"The Electronic Demand Water Softener with Variable Reserve (The Lindsay Know It All)" by Lindsay Corp., Publication Date Feb. 1982.
Sales Literature—"Water King Solid State 301 & 302" by Water King, Sta-Rite Industries, Publication Date Unknown.

Primary Examiner—Ivars C. Cintins
Attorney, Agent, or Firm—Quarles & Brady

[57] ABSTRACT

An improved control for a particle bed water treatment device includes a microcomputer which is supplied with input data from a flowmeter indicative of the quantity of treated water leaving the water treatment device. In accordance with the flow data, the microcomputer determines the amount of water used since the last regeneration and also determines the average daily treated water consumption. The microcomputer is also coupled to a data input device and receives input data indicative of the total particle bed treating capacity resulting in complete particle bed exhaustion. To recognize and account for the additional particle bed capacity that is created when a partially exhausted particle bed is regenerated, the microcomputer advantageously adjusts the total treating bed capacity value received from the data input device in accordance with the remaining particle capacity existing prior to regeneration. At a prescribed hour each day, the microcomputer determines the remaining particle bed treating capacity in accordance with the difference between the adjusted total capacity and the amount of water used since the last regeneration. The remaining particle bed treating capacity is compared to the reserve established as a proportion of the average daily consumption of treated water and regeneration is initiated when the reserve is greater than the remaining particle bed treating capacity.

6 Claims, 9 Drawing Figures

MICROCOMPUTER CONTROLLED DEMAND/SCHEDULED WATER SOFTENER WITH VARIABLE CAPACITY

BACKGROUND OF THE INVENTION

This invention relates generally to a control unit for a resin bed type water softener and more particularly to an improved microcomputer-based control unit for a resin bed water softener which continually monitors the resin bed capacity and adjusts for the additional capacity created when a partially exhausted resin bed is regenerated with the amount of regenerant normally required by a fully exhausted resin bed.

The most common type of water softener is the ion exchange resin-type softener having a vertically disposed tank which holds a bed of resin through which the hard water is passed to remove undesirable minerals and other impurities. The capacity of the resin bed to absorb minerals and impurities is finite and it is thus necessary to periodically recharge or regenerate the resin bed with a regenerant, typically a brine solution, by causing the brine solution to flow from one end of the tank to the other so as to restore the capacity of the resin bed for further water treatment.

The two types of processes commonly employed to regenerate a resin bed water softener are co-current regeneration and counter-current regeneration. Co-current regeneration is accomplished by causing the regenerant fluid (brine solution) to flow in the same direction as the normal or service flow of the incoming water through the resin bed. Typically, the service flow is directed downwardly against the resin bed to keep the resin bed compacted. In contrast, counter current regeneration is achieved by causing the regenerant fluid to flow upwardly, at a low velocity, through the resin bed to maintain the resin bed in a compacted mass. As will be understood by those skilled in the art, the downward and upward flow of regenerant during co-current and counter-current regeneration, respectively, could be reversed if other means were employed to maintain a compacted resin bed.

During the normal or service flow of water through the resin bed, the hard water entering the flow inlet tends to first exhaust the resin nearest the inlet so that the resin within the tank tends to stratify into an exhausted section adjacent to the service inlet and an undiminished or unexhausted section adjacent to the service outlet. The unexhausted portion of the resin bed is separated from the exhausted section by a relatively narrow band of resin comprised of a mixture of exhausted and unexhausted resin particles. During a co-current regeneration, the regenerant, which flows in the same direction as the service flow, first contacts the exhausted resin causing the metallic or hardness ions that were previously exchanged during the service flow of water, to be released from the resin and replaced with the ions of the regenerant. Before the hardness ions may be flushed from the resin tank, the hardness ions must pass through the unexhausted resin adjacent to the outlet. However, as the hardness ions pass through the unexhausted resin, the hardness or metallic ions are exchanged with the unexhausted resin as occurs normally during the softening process. Thus, the previously unexhausted resin becomes exhausted. Therefore, the regenerant fluid contacts only the exhausted resin as it flows toward the outlet and, as a result, there is no difference during a co-current regeneration between when the resin bed is partially exhausted or when the bed is totally exhausted. The capacity of the resin bed remains the same regardless of whether the bed is partially exhausted or fully exhausted.

During a counter-current regeneration, the regenerant flows in a direction opposite to that of the service flow and thus enters the resin bed through what was the service flow outlet and first contacts the unexhausted resin. Since the unexhausted resin contains no metallic or hardness ions, the regenerant generally remains unaffected as it flows through the unexhausted resin until the regenerant passes into the exhausted resin portion where ion exchange does occur, causing the regeneration of the exhausted resin. As a consequence, the released hardness ions pass only through the exhausted resin without further exchange as they are flushed from the resin bed. The counter-flow of regenerant during counter-current regeneration results in an effectively increased amount of regenerant, as measured in pounds, that is available to regenerate the exhausted resin, as measured in cubic feet, of a partially exhausted resin bed in comparison to a completely exhausted resin bed. This may be seen from the following example. Assuming the amount of regenerant used during each regeneration is set at 6 pounds of brine (NaCl) solution and the volume of resin in the tank is 1 cubic foot, then, the regenerant level applied to completely exhausted bed will be given as follows:

$$\text{Regenerant level} = \frac{6 \text{ lb.}}{1 \text{ cubic foot}} = 6 \text{ lb./ft}^3 \quad (1)$$

When the resin bed is only two-thirds exhausted ($\frac{1}{3}$ capacity remaining) then, assuming that the regenerant only acts upon the exhausted portion of the resin bed, the regenerant level applied to the exhausted resin will be given by $$\text{Regenerant level} = \frac{6 \text{ lb.}}{\frac{2}{3} \text{ cubic foot}} = 9 \text{ lb./ft}^3 \quad (2)$$

Thus, the effective regenerant level applied to the exhausted portion of the resin bed is much greater than the regenerant level applied to the bed where the bed completely exhausted.

It is well known to those skilled in the art that the additional resin bed capacity created upon regeneration of a partially exhausted resin bed is a function of the regenerant level. For example, the resultant capacity-regenerant level relationship for a common resin, such as IONAC type C-253 resin, manufactured by Sybron Corporation, Birmingham, N.J., is illustrated below in Table 1.

TABLE I

| Regenerant level (lb. of NaCl/cubic feet) | Capacity (grains of CaCO$_3$/cubic foot) |
|---|---|
| 6 | 20,000 |
| 9 | 27,500 |
| 12 | 30,000 |
| 15 | 31,500 |

As may be appreciated from examination of Table I, the capacity does not increase in direct proportion to the regenerant level.

Using the capacity data set forth in Table I, the increase in capacity for the previous example may be calculated in the following manner. If the one cubic foot resin bed is completely exhausted, and the regenerant level is 6 lbs./ft.$^3$, and the resultant capacity will be given by $$\text{Resultant Capacity} = 1 \text{ ft.}^3 \times 20{,}000 \text{ grains/ft.}^3 = 20{,}000 \text{ grains} \qquad (3)$$

Assuming that $\frac{2}{3}$ of the resin bed is exhausted and $\frac{1}{3}$ remains unexhausted, the capacity of the unexhausted resin bed, assuming that it had been completely regenerated during a previous interval with a regenerant level of 6 lb./ft.$^3$, will be given by $$\text{Resultant Capacity} = \tfrac{1}{3} \text{ ft.}^3 \times 20{,}000 \text{ grains/ft.}^3 = 6{,}666 \text{ grains} \qquad (4)$$

The resultant capacity of the exhausted resin, when regenerated with an effective regenerant level of 9 lb./ft.$^3$ as determined previously by Equation (2) will be given as follows $$\text{Resultant Capacity} = \tfrac{2}{3} \text{ ft.}^3 \times 27{,}500 \text{ grains/ft.}^3 = 18{,}333 \text{ grains} \qquad (5)$$

The total capacity is the sum of the capacity of the unexhausted $\frac{1}{3}$ portion of the bed (6,666 grains) plus the capacity resulting from regeneration of the $\frac{2}{3}$ portion of the exhausted bed with a regenerant level of 9 lb./ft$^3$ (18,333 grains) as may be seen from Equation 5 which is $$\text{Total Capacity} = 6{,}666 + 18{,}333 = 25{,}000 \text{ grains} \qquad (6)$$

The capacity increase will be given by $$\text{Capacity Increase} = 25{,}000 - 20{,}000 = 5{,}000 \text{ grains}$$

As may be appreciated from Equation (6), a 25% capacity increase is obtained. If the hardness of the incoming water is 20 grains per gallon, then the volumetric increase in capacity would be given by $$\text{Volumetric Increase} = \frac{5{,}000 \text{ grains}}{20 \text{ grains/gallon}} = 250 \text{ gallons.}$$

The foregoing example thus indicates that a significant amount of additional capacity may be obtained merely by recognizing the increased capacity resulting from regeneration of the exhausted portion of the resin bed with a regenerant level which is effectively greater than that employed to regenerate a completely exhausted bed.

Present day water softener controls, and even the advanced microcomputer-based water softener control disclosed in the now allowed U.S. patent application Ser. No. 412,279 now U.S. Pat. No. 4,426,294 for "Microcomputer Controlled Demand/Scheduled Water Softener" filed by J. David Seal on Aug. 27, 1982, and assigned to the assignee of the present invention, do not recognize and evaluate the additional capacity resulting from regeneration of the exhausted portion of the resin bed with the increased regenerant level. If a control could recognize and evaluate the additional capacity, then the number of regenerations would be reduced without increasing the possibility of delivering unsoftened water. By reducing the number of regenerations, a savings of regenerant and water would be effected.

It is an object of the present invention to provide an improved water softener control unit which utilizes a microcomputer to control water softener resin bed regeneration.

It is another object of the present invention to provide an improved microcomputer-based water softener control unit which controls water softener resin bed regeneration in accordance with the remaining capacity of the water softener resin bed to treat water.

It is yet another object of the present invention to provide an improved microcomputer-based water softener control unit which initiates water softener resin bed regeneration when the remaining resin bed capacity as determined from the actual soft water consumption is less than a reserve value calculated in accordance with the actual soft water consumption so that regeneration occurs only when necessary, thereby achieving a savings of regenerant and water.

It is yet another object of the present invention to provide an improved microcomputer-based water softener control which recognizes and adjusts for the increased capacity created when a partly exhausted resin bed is regenerated. The control initiates regeneration based on the additional capacity value so as to achieve an even greater savings of regenerant and water.

BRIEF SUMMARY OF THE INVENTION

Briefly, in accordance with the preferred embodiment of the invention, I have provided a control for a water softener requiring periodic resin bed regeneration comprising a flowmeter for detecting the quantity of softened water leaving the softener. A data input device is also provided for receiving data indicative of the capacity of the resin bed and the hardness of the incoming water. Both the flowmeter and the data input device are coupled to a controller which determines the average daily consumption of soft water from the flowmeter data. The controller reads the hardness and capacity data and adjusts the capacity data in accordance with the capacity remaining before the previous regeneration to account for the additional capacity that may have been created during the previous regeneration if the resin bed was regenerated when partially exhausted. The remaining capacity is determined by subtracting the quantity of water consumed thus far from the adjusted capacity data. Once the remaining resin bed treating capacity is calculated, the controller determines whether or not regeneration should occur by comparing remaining resin bed treating capacity to a reserve value established by the controller in accordance with the actual average consumption of soft water. If the remaining resin bed treating capacity is less than the established reserve value, then regeneration is initiated.

In accordance with another aspect of this invention, I have provided an improved method for controlling water softener resin bed regeneration commencing with the steps of measuring the quantity of water leaving the softener over a given period of time and then determining the actual daily average quantity of soft water consumed and the amount of soft water used since the last regeneration in accordance with the measured amounts of soft water leaving the softener. Thereafter, a reserve quantity of soft water is established from the calculated daily average of soft water consumption. The remaining water softener resin bed treating capacity is calculated by subtracting the quantity of water consumed from a total capacity value which is calculated by first determining the original resin bed treating capacity in accordance with the water hardness and then adjusting the capacity value to account for the additional capacity that resulted if the resin bed had been regenerated when partially exhausted. Water softener resin bed regeneration is effected when the remaining water softener resin bed treating capacity is less than the established reserve value.

In operation of my improved control, data from the flowmeter is monitored by the microcomputer and at a particular time each day, as determined by the clock, data representing the actual amount of soft water used during the previous 24 hour period is stored in the memory. Typically, seven consecutive values representing the actual daily soft water usage for each of the previous seven days are stored in the memory. After storing the soft water consumption data, the microcomputer first calculates the total amount of soft water used since the last regeneration from the data stored in memory and then determines the actual average daily soft water used by averaging the stored data representing actual soft water usage. Following calculation of the total amount of soft water used since the last regeneration, the microcomputer then calculates the remaining resin bed capacity by subtracting the amount of resin bed capacity depleted, as determined from the total amount of soft water used since the last regeneration, from an adjusted capacity value. The adjusted capacity value is calculated by first reading the input capacity data, representing the total capacity of the water softener prior to complete resin bed exhaustion and then adding a value representing the additional capacity that resulted when the resin bed was regenerated when only partially exhausted. Having now calculated the remaining water softener capacity, this value is then compared to a reserve value established by the microcomputer as a proportion of the determined actual average daily soft water usage.

Typically, the reserve is calculated by multiplying the actual average daily soft water usage by 1.2. If the reserve is greater than the calculated remaining water softener capacity, then water softener regeneration is initiated. Otherwise, the microcomputer only updates the data received from the flowmeter and waits another 24 hours before repeating these calculations to determine whether or not regeneration should occur.

Furthermore, another advantage of the water softener control of the present invention is that the control can account for exceptional variations in soft water usage. If the usage during any one of the previous seven days is less than 20% of the calculated average, then that small value of soft water usage is not entered in memory as the daily usage, but is added to the amount of soft water used since the previous regeneration. Also, should the previous day's consumption exceed 200% of the average daily consumption, then that previous usage will be substituted as the reserve, to assure that sufficient water softener resin bed capacity exists for the increased soft water usage.

Additionally, the control of the present invention provides an additional advantage by recognizing and adjusting for the additional capacity created when a partially exhausted resin bed is regenerated with the normal amount of regenerant. The control recognizes and adjusts for the additional capacity by establishing a surplus factor equal to the ratio of the amount remaining capacity to the total adjusted capacity which initially is set equal to the input capacity. During each subsequent cycle, a new value for the total adjusted capacity is obtained from the product of surplus factor and a capacity coefficient, representing the increased capacity attributed to regeneration with an effectively greater regenerant level. In practice, the capacity coefficient is obtained from a look up table in accordance with the previously calculated surplus value. The capacity coefficient table values are obtained empirically, based on the type of resin and anticipated water conditions.

BRIEF DESCRIPTION OF THE DRAWINGS

The invention, both as to organization and method of operation, together with further objects and advantages thereof may best be understood by reference to the following description taken in conjunction with the accompanying drawings in which:

FIG. 4a is a cut away view of the water softener of FIG. 1 taken along lines 4a—4a.

DETAILED DESCRIPTION OF THE PREFERRED EMBODIMENT

Figure 1:
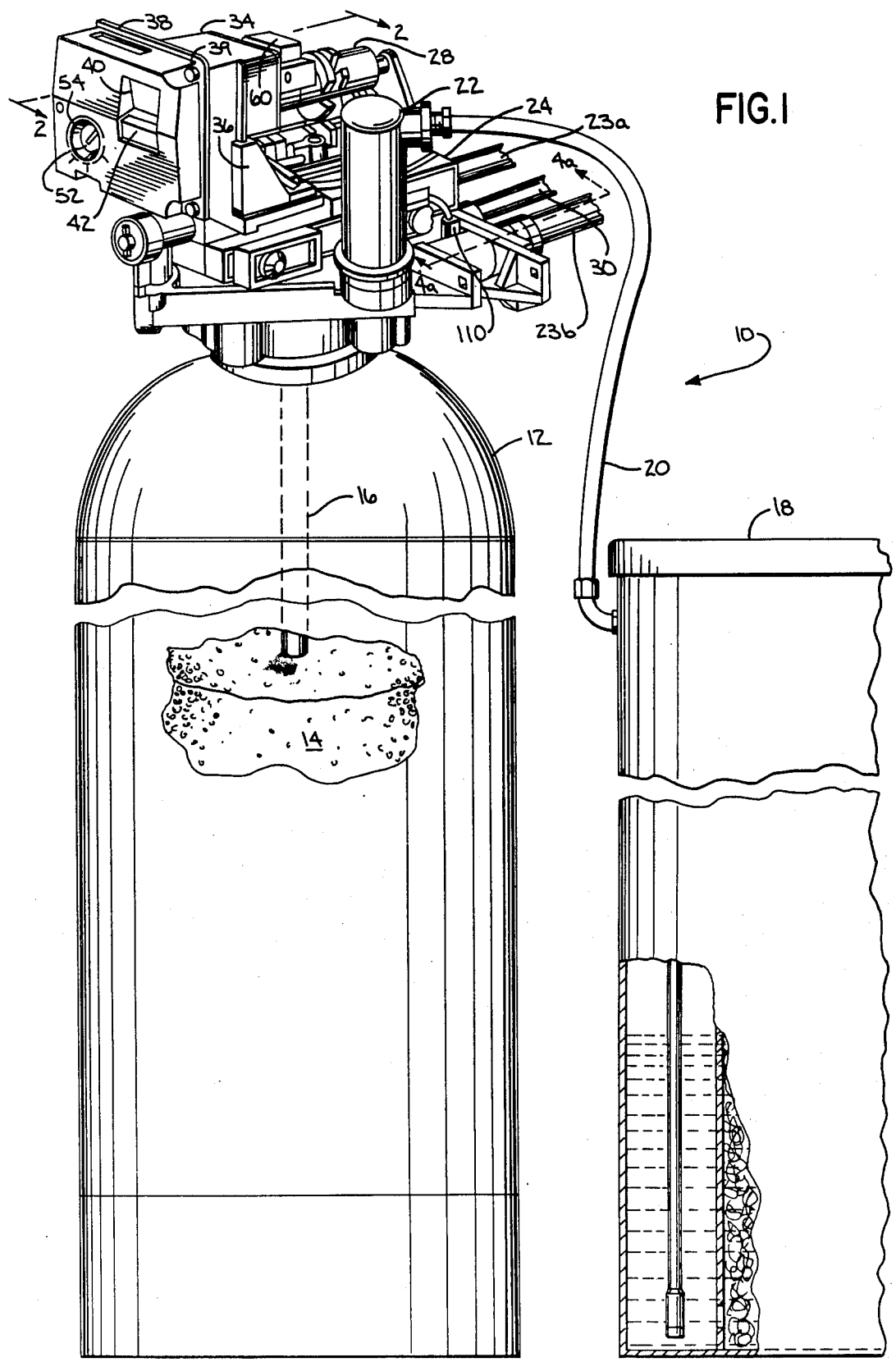
FIG. 1 is a resin bed type water softener embodying the control of the present invention.

Referring now to the Figures, FIG. 1 illustrates a resin bed type water softener 10 which includes a tank 12 containing a resin bed 14. As incoming hard water enters the tank through an opening (not shown) in the top thereof, the water in the tank is forced through the resin bed and out the draw pipe 16 extending through the center of the resin bed so that water exiting via the draw pipe has been treated by the resin bed to remove minerals and other impurities. The capacity of resin bed 14 to absorb the minerals and impurities of the incoming hard water is finite, and depends on the treating capacity of the resin in the tank as measured in kilograins of hardness as well as the hardness of the incoming water as typically measured in grains per gallon. To regenerate the resin bed, once its treating capacity has been depleted, the resin bed is flushed with a brine solution so that the minerals and other impurities can be released from the resin bed and carried out the tank. In practice, the brine solution is stored in a separate tank 18 and is admitted to the softener tank 12 during regeneration through a tube 20 and a air check valve 22.

Figure 2:
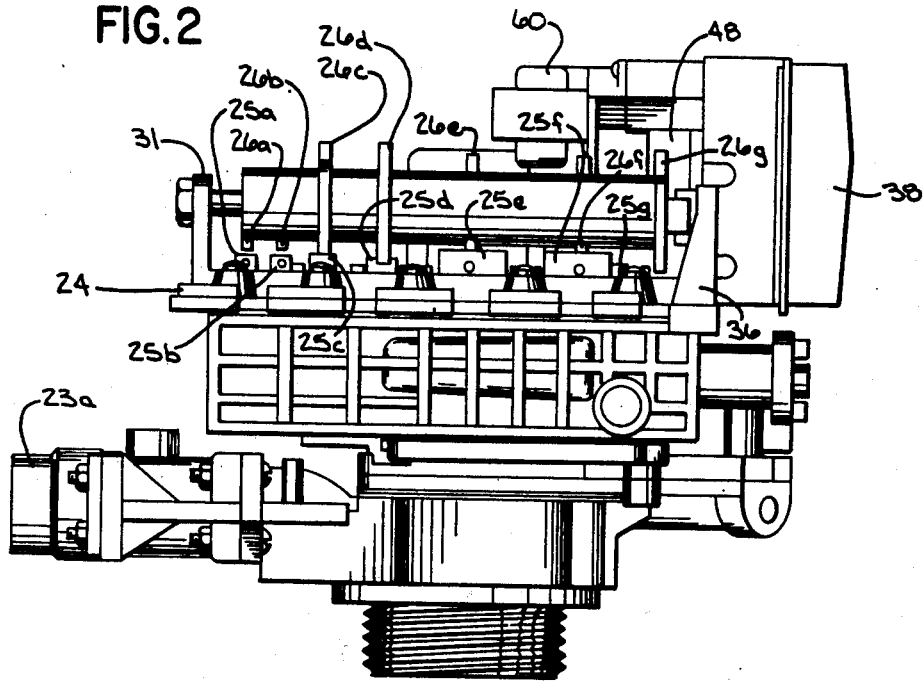
FIG. 2 is a side view of the control of the water softener illustrated in FIG. 1.

The control of the brine flow into tank 12 from brine tank 18 as well as the control of hard water flowing into the tank via inlet 23a and the flow of soft water leaving the tank via outlet 23b is accomplished by a valve module 24 threaded on the top of tank 12 so as to be in communication with the tank inlet (not shown) and draw pipe 16. Valve module 24 typically comprises a control body such as manufactured by Autotrol Corporation, Glendale, Wis. As best illustrated in FIG. 2, valve module 24 includes seven disc-type valves 25a through 25g, respectively. In the present valve module, valves 25e and 25f are designated as the inlet and outlet valves, respectively, as the valves 25e and 25f each regulate the flow of hard water into tank 12 from inlet 23a and the flow of soft water up from draw pipe 16

(FIG. 1) out through to outlet 23b, respectively. Valve 25g serves to regulate the flow of brine from brine tank 18 down the draw pipe 16 and then into tank 12 and is therefore referred to as the brine valve. The valve 25d controls water flow in the valve module through a port (not shown) in communication with inlet 23a and outlet 23b so that when the inlet and outlet valves are closed, water may flow directly through the inlet and out the outlet while valve 25d is open. The remaining valves 25a, 25b and 25c serve to control the flow of water and brine from the tank into a drain conduit 30 (FIG. 1).

Figure 3:
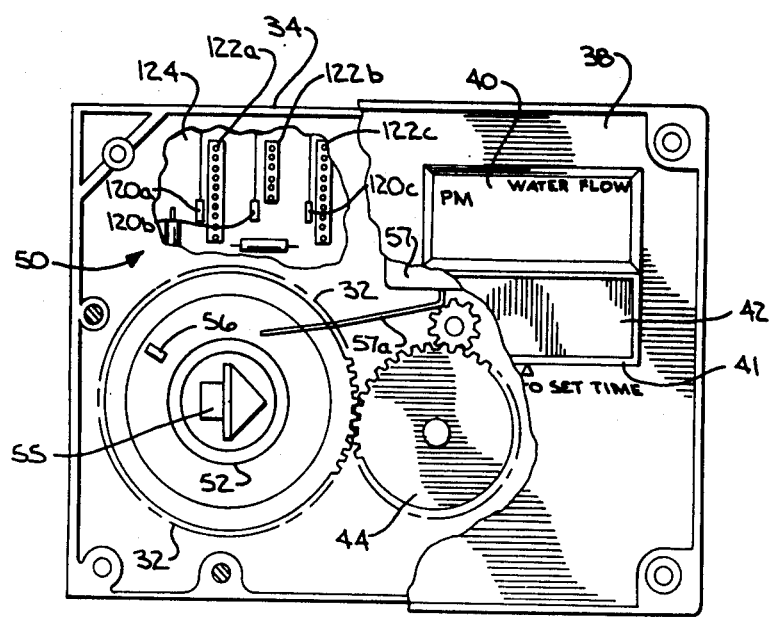
FIG. 3 is a front view of the control of the water softener illustrated in FIG. 1.

During a regeneration cycle, each of valves 25a through 25g is actuated at an appropriate interval by a separate one of the corresponding cams 26a through 26g carried on a cam shaft 28 when the cam shaft is rotated to bring the corresponding cam into contact with the valve. Cam shaft 28 is journaled at its rear end into a cam shaft support 31 extending upwardly from the valve module. The forward (rightward) end of cam shaft 28 has a forwardly extending shank for engaging the "T" shaped slot in the rearward end of the outwardly extending shaft 32a of a gear 32 (FIG. 3). As best illustrated in FIG. 3, gear 32 is journaled for rotation within the cavity 33 of a control housing 34. Returning to FIG. 2, control housing 34 is slidably secured to the forward end of the valve module 24 by a pair of support guides 36 (FIGS. 1 and 2) which each engage complimentary flanges (not shown) on the exterior of the control housing.

What has been described thus far with respect to the construction and operation of the valve module 24 is well known in the art.

The cavity 33 (FIG. 3) within the forward end of the control housing 34 is closed by a cover 38 which is secured to the forward end of the control housing by screws 39 (illustrated in FIGS. 1 and 3). Referring now to FIG. 3 which is a frontal view of control housing 34 showing portion of cover 38 cut away, cover 38 is generally opaque except for a window 40 which carries the indicia "PM" and "WATER FLOW". As will become clear hereinafter by reference to FIG. 4, window 40 allows a display within the cavity to display certain information. Immediately below window 40 is a passageway 41 through the cover which has a spring biased button 42 protruding outwardly therethrough. As will also become clear by reference to FIG. 4, button 42 is depressed to set the time displayed by the display through window 40.

With a portion of cover 38 broken away in FIG. 3, it can be observed that not only is gear 32 journaled within the cavity 33, but an idler gear 44 is also journaled within cavity 33 and is in meshing engagement with gear 32. Idler gear 44 is driven by a gear 46 which is carried on the forward end of the shaft of motor 48 (FIG. 2); the motor being mounted on the rear of the control housing so that its shaft extends through the control housing 34 and into the cavity to receive gear 46.

Motor 48 of FIG. 2, which is typically a 1 RPM A.C. clock motor, is energized with alternating current by a control circuit 50 of FIG. 4 (described hereinafter) when the control circuit determines, in accordance with a particular algorithm, that regeneration should be effected. Motor 48, when energized from control circuit 50, drives cam shaft 28 through gears 46, 44 and 32 to cause cams 26a through 26g to actuate a corresponding one of valves 25a through 25f, respectively. The cams 26a–26f are shaped such that valves 25a through 25f, respectively, are actuated in a particular sequence for a particular duration during a single revolution of the cam shaft so that the brining, slow rinse, back wash and brine refill & purge Steps, which are normally required to complete resin bed regeneration, are performed in the desired sequence. Following a single revolution of the cam shaft, the valves return to the service position so as to allow normal water flow through the softener.

Although water softener resin bed regeneration is normally effected when control circuit 50 energizes motor 48, there may be instances when manual regeneration is desired. To enable manual regeneration, gear 32 has a hub 52 extending forwardly of the gear and through an opening 54 (FIG. 1) in cover 38. Gear 32 and hub 52 are spring biased from shaft 32a so that when the hub 52 of the gear is pushed inwardly, gear 32 becomes disengaged from idler gear 44 so as to allow the cam shaft to be manually rotated upon rotation of the hub. As the hub is rotated either manually, or upon the gear 32 being driven by the motor 48, an arrow 55 on the hub points to indicia (not shown) on the face of cover 38 representing the various states of water softener operation, to indicate which Step of the regeneration cycle is then being executed, or, whether valves are presently in the service position.

Protruding outwardly from the gear 32 is a member 56 which, as the gear rotates, comes into contact with the spring biased arm 57a of a leaf switch 57. Leaf switch 57 is connected to control circuit 50 in a manner described hereinafter. The switch is actuated either by member 56 as the gear is rotated or when the hub is simply depressed since the outward force of the member 56 keeps the spring biased arm 57a from normally moving downwardly to actuate the switch. When switch 57 is actuated, the control circuit initiates regeneration. Thus, regeneration can be effected not only by manually rotating hub 52 but by simply depressing the hub to activate switch 57.

Figure 4:
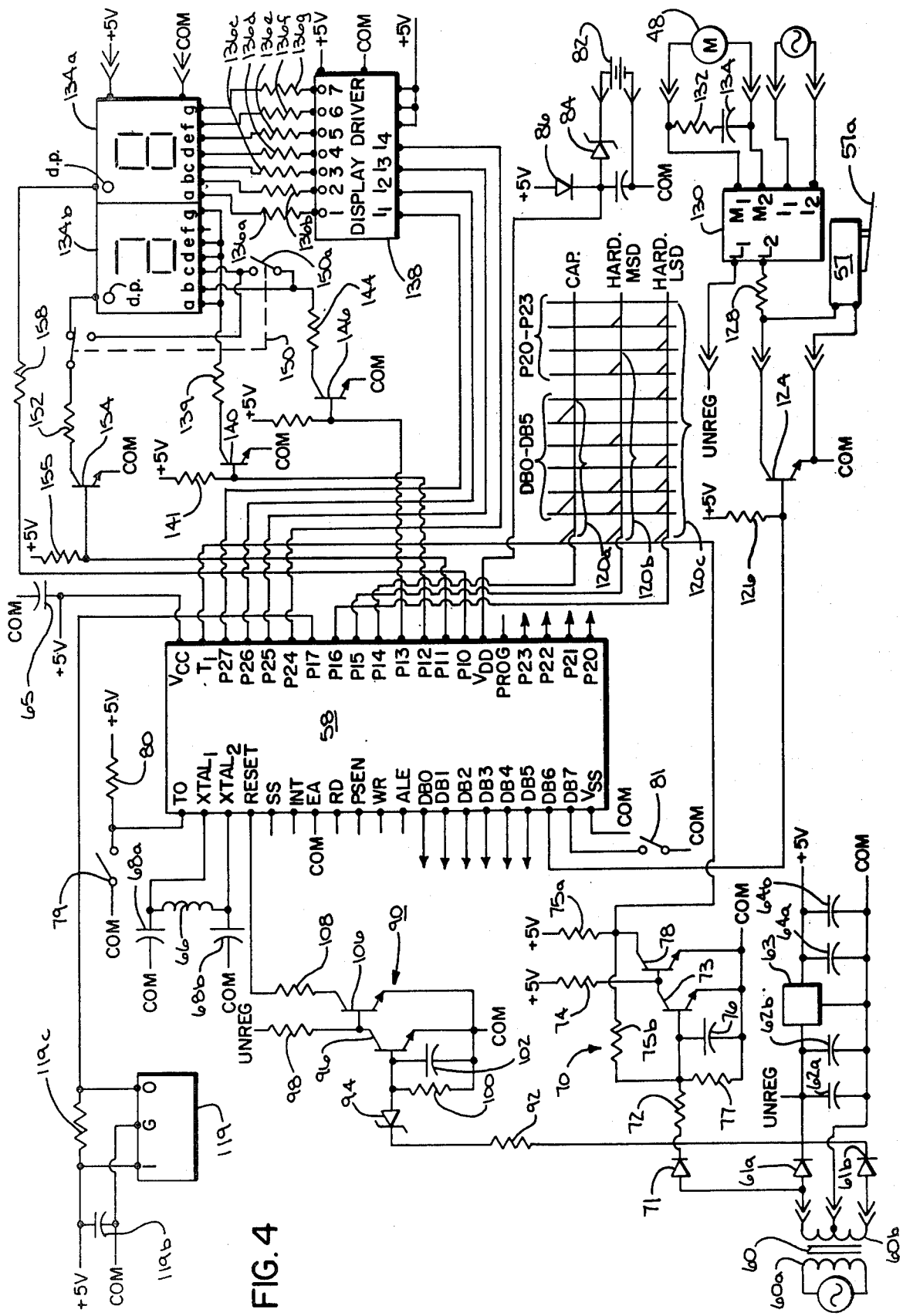
FIG. 4 is an electrical schematic diagram of the circuitry embodied in the control of the water softener illustrated in FIG. 1.
Figure 4A:
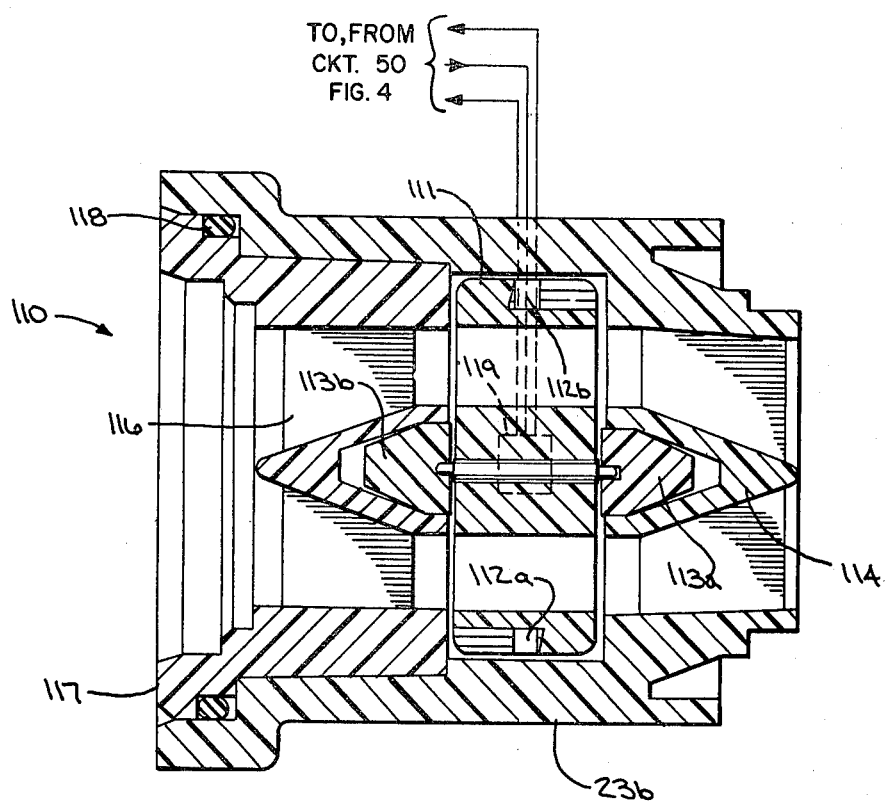

The details of control circuit 50 are set forth schematically in FIG. 4. At the heart of control circuit 50 is a data processing unit 58 which, in the presently preferred embodiment, takes the form of a single chip microcomputer, such as a model 8048 microcomputer, as manufactured by Intel Corp., Santa Clara, Calif. Microcomputer 58 includes "on-board" random access memory for storing data and particularly capacity previously entered to the microcomputer as well as the data, such as the adjusted capacity developed during the course of microcomputer operation. Also, the microcomputer 58 includes on-board read only memory in which is stored the operating program to be described in greater detail with respect to FIGS. 5A to 5D. This program controls the operation of the internal microcomputer arithmetic logic unit which performs the necessary calculations and logic determinations, to decide whether regeneration should be effected. The read only memory within the microcomputer 58 also stores a look up table containing capacity coefficient values which, as described hereinafter, enable the microcomputer 58 to recognize and adjust for the additional capacity created when a partially exhausted resin bed is regenerated with a normal regenerant level. Each of the capacity coefficient values stored in the microcomputer 58 read only memory is proportional to the increased capacity attributable to regeneration of a partially exhausted resin bed with a particular regenerant level. In addition to the on-board memory and the arithmetic logic unit, microcomputer 58 also includes an internal timer which serves as a real time clock. For a further, more complete description of the Model 8048 microcomputer, reference should be had to the "MCS-48 User's Manual," published by Intel Corporation.

A 5 volt regulated d.c. voltage to energize microcomputer 58 is supplied to the microcomputer at its Vcc pin by a power supply 59, comprised of a transformer 60 whose primary winding 60a is coupled to a supply of 110-220 volt, 50-60 Hertz a.c. supply (not shown). Because of the lack of space within the cavity 33 for the transformer, transformer 60 is mounted to the rear of the control housing as shown in FIG. 2. The low voltage a.c. produced across the center tapped transformer secondary winding 60b when the primary winding 60a is coupled to the a.c. supply voltage, is rectified by a pair of diodes 61a and 61b whose anodes are each coupled to one of opposite ends of the transformer secondary winding 60b. With the diode cathodes connected together, an unregulated d.c. voltage appears between the junction of the diode cathodes, hereafter referred to as the power supply unregulated voltage (unreg) output terminal, and the transformer center tap, hereinafter referred to as the power supply common (com) terminal.

The unregulated d.c. voltage present between the unregulated voltage and common terminals of power supply is filtered by a pair of parallel coupled capacitors 62a and 62b before being supplied to a voltage regulator 63. The 5 volt regulated d.c. voltage produced at the output of the regulator, which is designated as the "+5V" output of the power supply, is filtered by a pair of capacitances 64a and 64b coupled in parallel between the +5V power supply terminal and the power supply common terminal before being supplied to pin Vcc of the microcomputer. Although the regulated 5 volt d.c. voltage produced by the power supply is well filtered, it is desirable to connect a filter capacitance 65 between microcomputer pin Vcc and the power supply common terminal. A completed circuit between the power supply and the microcomputer 58 is accomplished by connecting the microcomputer ground pin Vss to the power supply common terminal.

Within the microcomputer 58 is a master oscillator (not shown) whose periodic clock signals control the internal microcomputer timer and arithmetic logic unit. The frequency of this oscillator is determined from the reactance appearing across the microcomputer pins $XTAL^1$, and $XTAL^2$. In the presently preferred embodiment, this reactance is established by a inductance 66 coupled across the $XTAL^1$ and $XTAL^2$ pins of microcomputer 58 and a pair of capacitances 68a and 68b each coupled between a separate one of the microcomputer $XTAL^1$ and $XTAL^2$ pins and the power supply common terminal. The power supply common terminal is also coupled to the microcomputer pin EA to assure that during microcomputer operation, all memory accesses by the internal arithmetic logic unit in response to periodic timing signals from the internal master oscillator are made from the internal random access and read only memories of the microcomputer.

The internal timer of the microcomputer, which, as indicated, serves as a real time clock, is strobed or clocked in accordance with the alternations of the a.c. supply voltage. Since the a.c. supply voltage is accurately maintained either at 50 or 60 Hz, depending on the custom, the frequency of alternations of the a.c. supply voltage can be used as a basis of measuring real time. To strobe the internal microcomputer timer, a clocking circuit 70 is provided for supplying microcomputer at its T1 pin with a logic level voltage which changes logic states in accordance with the alternations of the a.c. supply voltage. Clocking circuit 70 includes a diode 71 and a resistance 72 serially coupled between the one of the two secondary winding terminals of transformer 60 and the base of a first transistor 73 whose collector-to-emitter portion is coupled in series with a resistance 74 between the +5 V and common terminals of power supply 59. Transistor 73 is also coupled at its base to the +5 V terminal of the power supply through a pair of serially coupled resistances 75a and 75b. Each time the a.c. voltage at the secondary 60b of transformer 60 undergoes an alternation, the transistor 73 is rendered conductive. A filter comprised of the parallel combination of a capacitance 76 and a resistance 77 filters stray noise to prevent false conduction of transistor 73.

A second transistor 78 has its base coupled to the junction between resistance 74 and transistor 73 and transistor 78 has its collector-to-emitter portion coupled between the junction resistances 75a and 75b and the power supply common terminal. The conduction of the transistor is controlled by transistor 73 and when transistor 73 is conductive, transistor 73 shunts current from the base of transistor 78 to keep transistor 78 from conducting. While transistor 73 is nonconductive, transistor 78 is supplied with base current and becomes conductive. In this way transistor 78 acts as a logic inverter so that the logic level voltage appearing across transistor 78, which is supplied to the microcomputer at pin T1 to strobe the internal timer, will be logically inverse to the logic level voltage appearing across the collector-to-emitter portion of transistor 73.

In order for the internal microcomputer timer to keep the correct time, the timer must usually be initially set to the appropriate time. Setting of the timer is accomplished by closing a switch 79 coupled between the microcomputer timing input at pin $T_o$ and the power supply common terminal input to force the voltage at the timing input to a logic low voltage level. In practice, switch 79 is activated by depressing button 42 protruding through the cover 38 (FIG. 3). While switch 79 is open, the timing input is maintained at a high logic level voltage via a resistance 80 coupled between the pin $T_o$ and the +5 V power supply terminal.

Because the internal microcomputer timer counts time in accordance with the alternations of the a.c. supply voltage as processed by clocking circuit 70, the microcomputer must be alerted as to whether the a.c. supply voltage frequency is 60 Hz, as is the case in the United States, or 50 Hz., as is the case in many European countries. To alert the microcomputer as to the a.c. supply voltage frequency, a switch 81 is coupled between the second highest order microcomputer data bus line (7) which terminates at pin DB7 and the power supply common terminal. After determining whether or not that bus is at a ground potential (i.e. whether or not switch 79 is closed) the microcomputer then knows whether the a.c. supply voltage is 50 or 60 Hz., respectively.

Normally, the microcomputer power is provided from power supply 59, and the timing signal for clocking the internal timer is provided from the clocking circuit 70. However, should the a.c. supply voltage fail, then not only does the clocking circuit fail to supply periodic pulses, but, more importantly, the internal microcomputer memories which store collected data may be erased. To keep at least the microcomputer memories from being erased, a battery 82 is coupled at its positive terminal via Zener diode 84 to the standby voltage input pin Vdd of the microcomputer 58. The negative terminal of the battery is coupled to the power supply common terminal. While there is an a.c. voltage at the input to the power supply 59, a regulated d.c. voltage is provided to pin Vdd from the power supply via a diode 86.

Usually, the battery voltage is less than the sum of the break over voltage of the Zener diode 34 and the voltage drop across diode 86, but is greater than the Zener diode break over voltage. Thus, only when the supply voltage fails will battery 82 render Zener diode 84 conductive and supply voltage to the microcomputer. Note that a capacitance could be substituted as an energy storage device in place of battery 82. A capacitor 87 is connected between microcomputer pin Vdd and the power supply common terminal to filter any noise.

Once the a.c. supply does fail, resetting of the microcomputer is usually necessary. A reset circuit 90 for accomplishing resetting of microcomputer upon "power up" includes a resistance 92 and a Zener diode 94 coupled in series between the power supply unregulated voltage output terminal and the base of a first transistor 96 whose collector-to-emitter portion is coupled in series with a resistance 98 between the power supply unregulated voltage output terminal and the power supply common terminal. The base-emitter junction of the transistor is shunted by the parallel combination of a resistance 100 and a capacitance 102.

A second transistor 106 has its base coupled to the junction between resistance 98 and transistor 96, and transistor 106 has its collector-to-emitter portion coupled in series with resistance 108 between the microcomputer reset input terminating at the RESET pin and the power supply common terminal. During intervals while a.c. is supplied to the power supply, transistor 96 is rendered conductive to divert current from the base of transistor 106 to keep it from conducting, thereby keeping the impedance at the microcomputer reset input high. However, once the a.c. supply voltage fails and then is reapplied to the power supply, transistor 96, which had become non-conductive once the a.c. supply voltage failed, will not again become conductive until the unregulated output voltage of the power supply 59 reaches the threshold voltage of Zener diode 94. In the meantime, with transistor 96 temporarily non-conductive, transistor 106 becomes conductive once the power is reapplied to provide a low impedance path between the microcomputer reset input and the power supply common terminal to reset the microcomputer.

As will become better understood by reference to flow chart FIGS. 5A-5D, microcomputer 58 is programmed to initiate water softener resin bed regeneration when the remaining resin bed treating capacity, as determined from the amount of water used since the previous regeneration and the water hardness, is less than a reserve value calculated as a percentage of the actual average daily soft water consumption.

Input data representing the flow of softened water leaving resin tank 12 of FIG. 1 is supplied from a flowmeter 110 (FIG. 1) disposed in the outlet 23$b$ to the highest order line (17) of the first of the two ports of microcomputer 58 terminating at pin $P_{17}$. Referring now to FIG. 4$a$, which is a cut away view of the inlet 23$b$ taken along lines 4$a$—4$a$ of FIG. 1, flowmeter 110 is comprised of a turbine 111 having a magnet 112$a$ embedded in the periphery of the turbine so that the south magnetic pole is facing radially outwardly. A counterweight 112$b$ is located in the turbine periphery opposite magnet 112$a$ to balance the turbine. The turbine is journaled at its rightward most end by a first bearing 113$a$ secured in a bearing strut 114 disposed in the rightward end of the outlet. Turbine 111 is journaled at its leftward most end by a bearing 113$b$ carried in a bearing strut 116 that is disposed in the interior bore of a collar 117 which is dimensioned to be received in the leftward most end of the outlet. An O-ring 118 is disposed in sealing engagement between the collar and the outlet to prevent water leakage. As water flows through the outlet, the force of the water drives the turbine 111, so that the magnet passes a Hall Effect switch 119 disposed in a wall of the outlet adjacent to the turbine.

Returning now to FIG. 4, Hall Effect switch 119, which typically comprises a model UGN 3040 T. Hall Effect switch as manufactured by Sprague Electric Co., Concord, N.H., is coupled at its input terminal I and its ground terminal G to the +5 V and common terminal of the power supply. A capacitance 119$b$ shunts the I and G input level to filter any stray noise. When energized in this manner, the Hall Effect switch generates a high logic level voltage at its output terminal each time the magnet of the turbine passes the switch. This voltage is supplied to the microcomputer at line 17 of the second microcomputer port terminating at the microcomputer pin $P_{17}$. By counting the number of voltage level transitions, the microcomputer can determine the turbine velocity, which is directly related to the flow rate of water leaving the softener. A pull up resistance 119$c$ couples the microcomputer pin $P_{17}$ to the +5 V power supply terminal to prevent random noise from causing an erroneous flow measurement.

Input data indicative of the total treating or softening capacity of resin bed 14 of FIG. 1 and data indicative of the hardness of the incoming water is entered into the microprocessor through the low order lines (0-5) of microprocessor data bus terminating, at pins $DB_0$ through $DB_5$ and through the four lower order lines (20-23) of the second microprocessor port which terminate at pins $P_{20}$-$P_{23}$. In practice, input data representing the total resin bed treating capacity is entered as a binary number, by connecting the appropriate ones of data bus pins $DB_0$-$DB_5$ and port pins $P_{20}$-$P_{23}$ to the fourth highest line (14) of the first microprocessor port terminating at pin $P_{14}$. The existence of a connection by way of an associated one of jumpers 120$a$ between one of data bus pins $DB_0$-$DB_5$ and port pins $P_{20}$-$P_{23}$, and port pin $P_{14}$ represents a binary 1 digit while the lack of a connection represents a binary zero digit. The most significant digit of the two digit number representing incoming water hardness, as measured in grains, is also entered as a binary number by connecting an associated one of data bus pins $DB_0$-$DB_5$ and port pins $P_{20}$-$P_{23}$ to the third highest line (15) of the second microcomputer port terminating at pin $P_{15}$ via one of jumpers 120$b$. The least significant digit of the two digit number representing the incoming water hardness is likewise entered as a binary number by connecting an associated one of data bus pins $DB_0$-$DB_5$ and port pins $P_{20}$-$P_{23}$ to the second highest line (16) of the first microprocessor port terminating at pin $P_{16}$ via an associated one of jumpers 120$c$. Since the incoming water hardness is entered as a two digit decimal number varying between 0 and 99, only four binary bits are required to represent each digit. Therefore only the four higher order data bus pins $DB_2$–$DB_5$ or the four port pins $P_{20}$–$P_{23}$ need be jumpered to one of port pins $P_{15}$ and $P_{16}$ to enter the most significant and least significant digits of the water hardness data. The remaining pins can be jumpered to cause the microcomputer to execute certain self-test instructions.

Referring to FIG. 3, each of pins $DB_0$–$DB_5$ and $P_{14}$–$P_{16}$ and $P_{20}$–$P_{23}$ of the microcomputer are connected to a separate one of the terminals of one of connector blocks 122a–122c which are carried on the circuit board 124 to which the components of control circuit 50 are mounted. During water softener installation, the installer enters data indicative of the total treating capacity and the incoming water hardness by connecting the appropriate terminals of connector blocks 122a–122c together with one or more of the appropriate jumpers 120a, 120b and 120c.

Returning to FIG. 4, if the microcomputer determines from the input flow meter data and the resin bed treating capacity and water hardness input data that regeneration is required, then the microcomputer outputs a high level logical voltage on the second highest order data bus line (6) terminating at pin $DB_6$. This voltage is supplied to the base of a transistor 124 which is also supplied with a regulated 5 volt d.c. voltage from the power supply via pull up resistance 126. Transistor 124 has its collector-to-emitter portion coupled in series with a resistance 128 between the power supply common terminal and one of the light emitter input terminals $L_2$ of an optical triac 130 whose other light emitter input $L_1$ is coupled to the unregulated voltage output terminal of the power supply. When transistor 124 is rendered conductive by microcomputer 58, the transistor provides a completed circuit path for current to pass in the light emitter of the optical isolator 130 to render the optical isolator conductive. Optical isolator 130, when rendered conductive, provides a completed circuit path between each of its input terminals $I_1$ and $I_2$, which are supplied with an a.c. voltage, and one of output terminals $M_1$ and $M_2$, respectively, which are coupled to motor 48. Thus, when transistor 124 is rendered conductive, the motor is energized with a.c. current to drive cam shaft 28 of FIGS. 1–3, thereby initiating resin bed regneration. To filter the voltage switched by optical triac 130, a resistance 132 is coupled in series with a filter capacitor 134 across terminals $M_1$ and $M_2$ of the optical triac.

As will be recalled, a switch 57 (FIG. 3) is positioned within cavity 33 so that the switch is actuated either upon depression of hub 52 and gear 32 or upon rotation of the gear. Returning to FIG. 4, switch 57 has its contacts connected to collector and emitter of transistor 124, respectively. Thus, when switch 57 is actuated, the switch shorts the collector-to-emitter portion of the transistor to energize the optical triac 130.

In addition to the previously described subcircuitry of the control circuit 50, the control circuit 50 also includes a display comprised of a pair of 7 segment light emitting diodes (L.E.D.'s) 134a and 134b for displaying not only the time of day as measured by the number of alternations of the a.c. supply voltage as recorded in the internal microprocessor timer, but also for providing an indication of soft water flow from the tank 12. Both of L.E.D.'s display 134a and 134b are coupled to the +5 V and unregulated output voltage terminals of the power supply 59. Each of the seven segments a–g of L.E.D. 134a is connected via a separate one of pull up resistances 136a through 136g, respectively, to a corresponding one of the outputs 01–07 of a display driver circuit 138 which typically comprises a model 74 LS 47 display driver such as manufactured by Texas Instruments, Dallas, Tex. In addition to being coupled to the +5 V and common terminals of power supply 59 so as to receive a regulated 5 volt d.c. voltage therefrom, display driver circuit 138 has its four input terminals $I_1$–$I_4$ coupled to a separate one of the four highest lines (24–27) of the second port of microcomputer 58 which terminate at microcomputer pins $P_{24}$–$P_{27}$ respectively. During execution of its internally stored program, microcomputer 58 outputs a four-bit binary signal at pins $P_{24}$–$P_{27}$ representing the least significant digit of the hour of the day which is supplied to the display driver 138 which in turn energizes the appropriate segments of L.E.D. display 134a to display this least significant digit of the hour of the day.

To enable control circuit 50 of the present invention to be utilized both domestically and internationally, it is desirable that L.E.D.'s 134a and 134b display the hour of the day either in a 12 hour fashion or a 24 hour fashion. To this end, segments a, d, e, and g of display 134b are each coupled to the common terminal of the power supply through resistance 139 in series with a collector-to-emitter portion of a transistor 140. Transistor 140 is coupled at its base to the power supply +5 V terminal via a pull up resistance 141 and is coupled to the third lowest order line (12) of the first port of the microcomputer terminating at pin $P_{12}$ so as to receive a high logic level voltage therefrom at appropriate intervals during execution of the microcomputer program to energize L.E.D. segments a, d, e and g. Segment b of L.E.D. display 134b is coupled to the power supply common terminal via a resistance 144 in series with a collector-to-emitter portion of a transistor 146. Transistor 146 is supplied at its base with a regulated five volt d.c. voltage from the power supply through a pull up resistance 148 and is also supplied in its base with the logic level output signal appearing on the third lowest line (13) of the first port of the microcomputer which terminates at microcomputer pin $P_{13}$. Segment c of L.E.D. display 134b is switchably connected by the first contactor 150A of a double pull, double throw switch 150 to resistance 144. The second contactor 150b of double pull, double throw switch 150 couples one terminal of a resistance 152, between the decimal point segment d.p. of the L.E.D. display 134b and segment c of light emitting diode 134b. The other terminal of resistance 152 is coupled by the collector-to-emitter portion of a transistor 154 to the power supply common terminal. Transistor 154 is supplied at its base with the five volt regulated d.c. output voltage of the power supply via pull up resistance 155 and is also supplied at its base with the logic level voltage of the second lowest order line (11) of the first microcomputer port terminating at microcomputer pin $P_{11}$. When switch 150 is set at the "12 Hr" position so that the decimal point segment d.p. of display 134b is coupled to resistance 152 and segment c is coupled in parallel with segment b, then when transistor 154 is rendered conductive as a result of a microcomputer generating a logic high voltage at pin $P_{11}$, which is the case during the p.m. hours of the day as determined by the internal microcomputer timer, decimal point segment d.p. of light emitting diode display 134b is energized. Once energized, the decimal point segment d.p. illuminates the indicia "PM" on the outer face of window 40 of FIG. 3 to indicate the hourly time displayed by L.E.D. displays 134a and 134b is after noon. With switch 150 in the "12 Hr" position, a "1" is displayed by L.E.D. display 134b when transistor 146 is rendered conductive by the microcomputer. This will occur when the time of day, as determined by the internal microcomputer timer, is between either noon and 1:00 p.m. or midnight and 1:00 a.m.

If, however, switch 150 is set at the "24 Hr" position so that transistor 154 now drives segment c of L.E.D. display 134b, then, L.E.D. 134b displays a "1" when both transistor 154 and transistors 146 are rendered conductive to energize segments b and c. This will occur when the microcomputer outputs a logical high level voltage at pins $P_{13}$ and $P_{11}$ during the interval when the time of day is between 1200 and 100 hours. During the interval when the time of day, as determined by the internal microcomputer timer, is between 2000 hours and 2400 hours, then the microcomputer outputs a logic high level voltage at both pins $P_{13}$ and pin $P_{12}$ so that segments a, d, e, and g are energized by transistor 140 and segment b is energized by transistor 146 to display a "2" at display 134b.

L.E.D. 134a, like display 134b is also provided with a decimal point segment d.p. which is linked via a resistance 158 to the lowest order line (10) of the first microcomputer port terminating at pin $P_{10}$. During intervals other than when regeneration is occurring that is, during intervals when soft water is flowing through resin bed 14 of FIG. 1 and out outlet 23b of FIG. 2, then, microcomputer 58 outputs a logic level voltage at pin $P_{10}$ which alternates between a high and low logic level to alternately energize the decimal point segment d.p. of L.E.D. display 134a. Decimal point segment d.p. of display 134b appears behind the indicia "WATER FLOW" on window 40 of FIG. 3 so that while water is flowing through the softener, the decimal point segment d.p. of L.E.D. 134a flashes.

As indicated previously, within the internal memory of microcomputer 58 of FIG. 4 is a program which controls the microcomputer to enable the microcomputer to process the incoming data to determine whether or not motor 48 of FIGS. 2 and 3 should be energized to initiate regeneration as well as to enable the microcomputer to display the time of day on L.E.D. displays 134a and 134b of FIG. 4.

PROGRAM START UP—STEPS 200-206

Figure 5A:
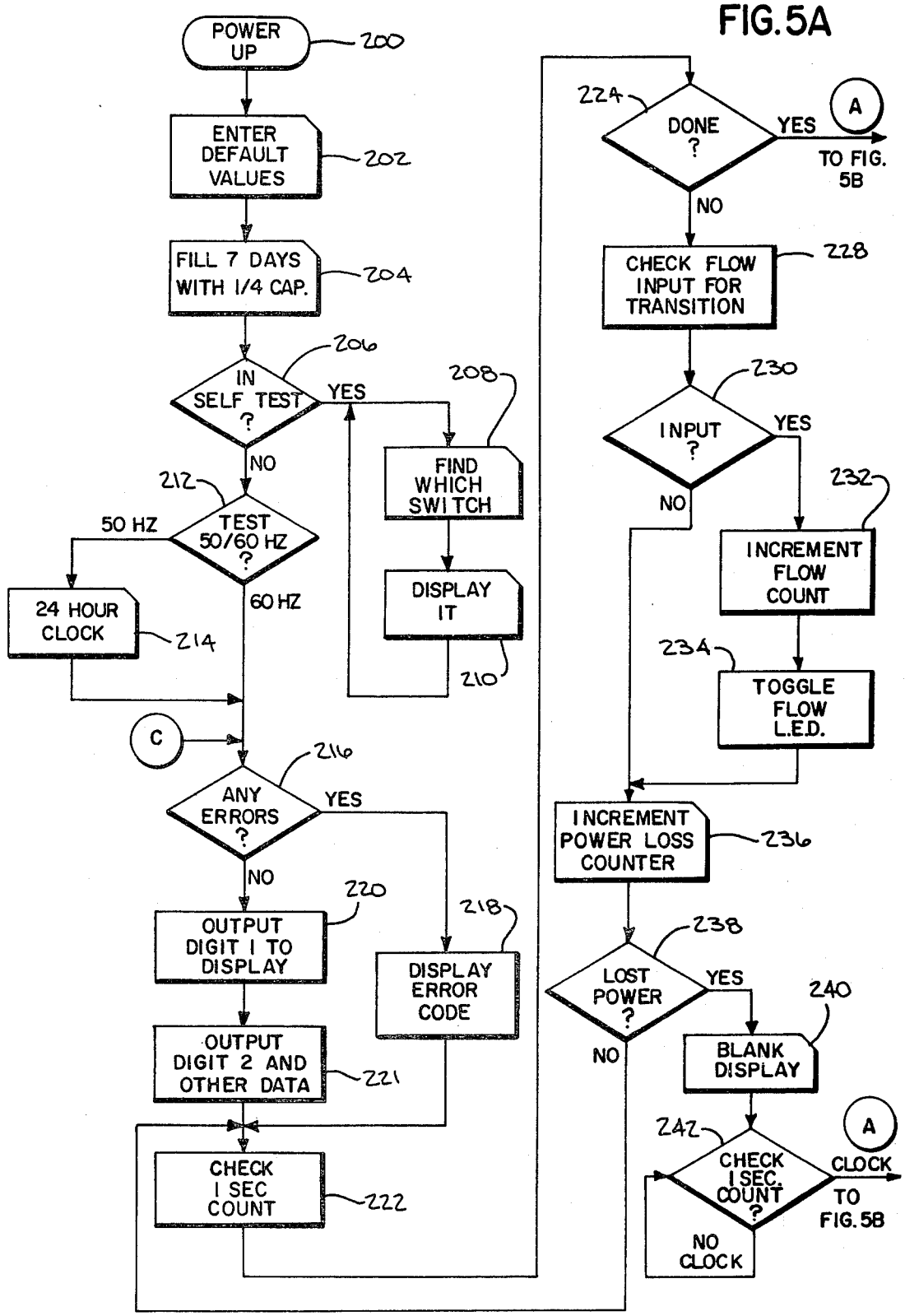
FIGS. 5A through 5D illustrate, in flowchart form, the program executed by the water softener control of the present invention during operation.
Figure 5B:
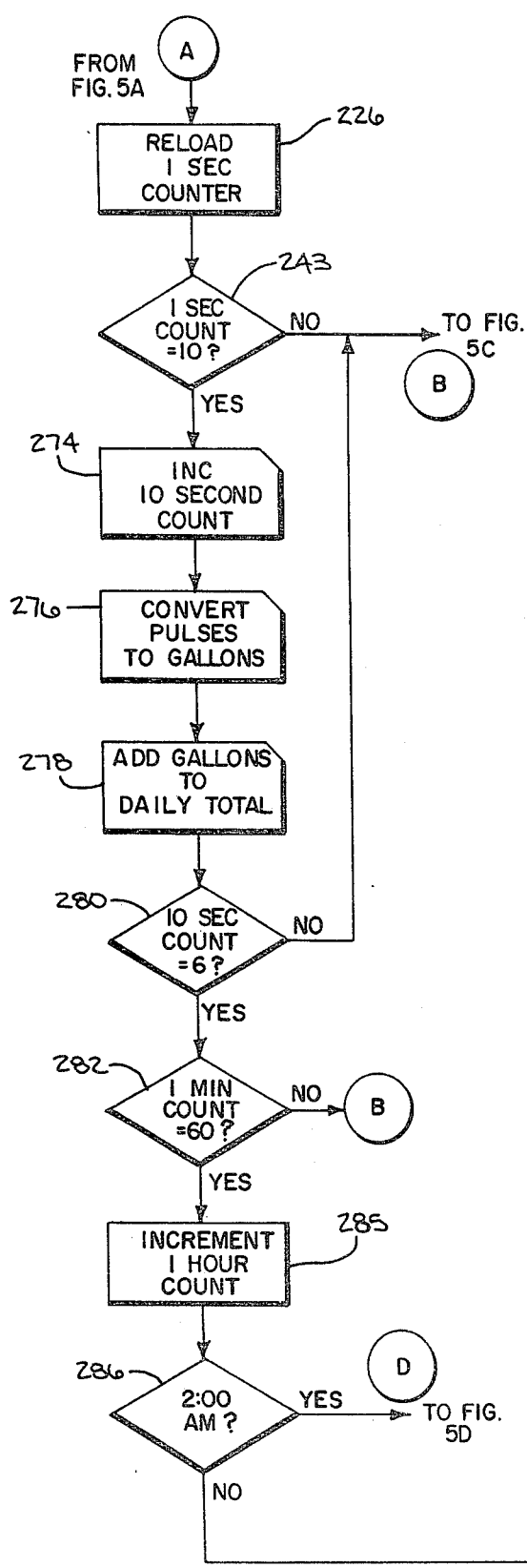
Figure 5B:
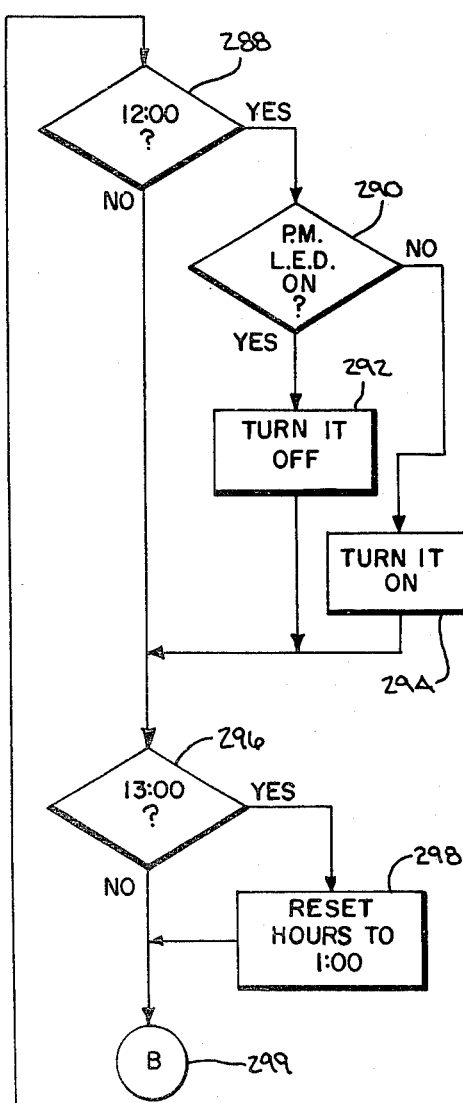
Figure 5C:
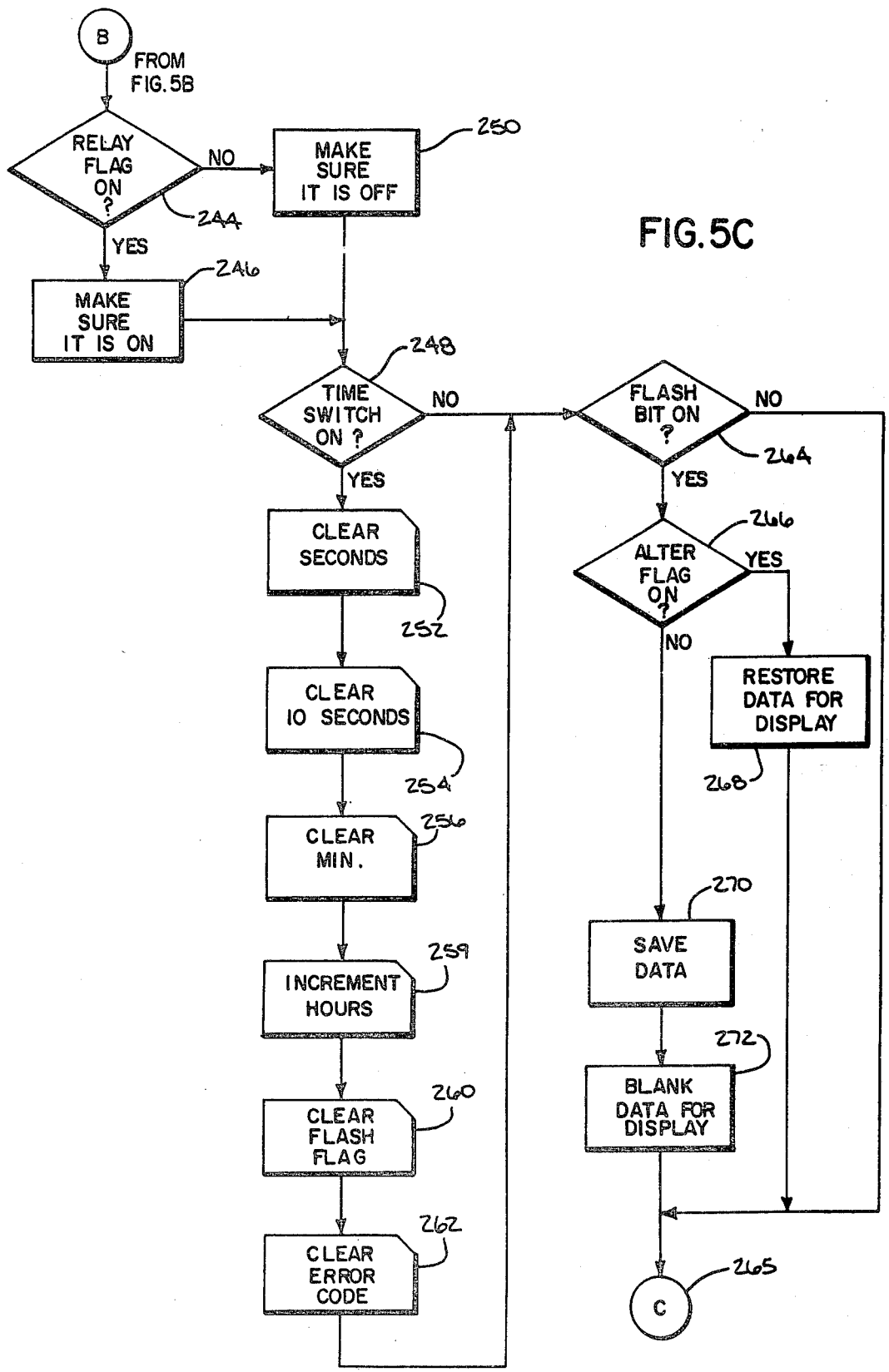

Referring now to FIGS. 5A through 5C which illustrate in flow chart form the program executed by the microcomputer and in particular FIG. 5A, execution of the microcomputer program is commenced (Step 200) when power is applied to the microcomputer. Following program startup, a default value for the time of day is entered into the register of the internal microcomputer timer for time keeping purposes (Step 202). Typically, this default value is "12 noon." However, the default value can be incremented while switch 79 of control circuit 50 is actuated so that if the correct hour of the day is other than 12 noon, then the appropriate value can be entered into the timer register. Following entry of the default value into the timer register, seven separate memory locations of the microcomputer internal memory are each filled with a value representing $\frac{1}{4}$ of the total refining capacity of resin bed 14 of FIG. 1, as measured in gallons (Step 204). Since the microcomputer of the present invention operates to initiate water softener regeneration when the actual treating capacity of resin bed 14 of FIG. 1 is less than a reserve quantity calculated in accordance with the actual average daily soft water consumption, the entry of finite artificial values for the daily amount of soft water consumed in place of the value 0 enables the microcomputer to better regulate the frequency of water softener regeneration during the first week of operation. Each of the seven artificial values representing the daily consumption of soft water used for a particular day of the week is, however, replaced with the actual value of the daily consumption of soft water as determined from the flow meter during later operation of the water softener control.

Also, during Step 204, a default value is entered for a variable, designated as the surplus value. As will be seen hereinafter, the surplus value serves to quantify the additional capacity resulting from regeneration of a partially exhausted resin bed. Since the additional capacity is initially zero, the default value for the surplus value is set equal to zero.

SELF TEST MODE STEPS 206-210

Following entry of each of the seven artificial values which initially represent the amount of soft water used for each of the seven days of a week, the microcomputer 58 then checks whether it is operating in a self test mode (Step 206). During installation as well as during intervals when the operation of microcomputer 58 is to be evaluated, the microcomputer is placed in a self test mode by jumpering certain of the microcomputer data bus pins $DB_0$–$DB_5$ and port pins $P_{20}$–$P_{23}$ to one of port pins $P_{14}$ and $P_{15}$. If the microcomputer is operating in the self test mode, then the microcomputer checks to see which of any of the switches connected thereto, such as switches 150 and switch 136, have been actuated (Step 208). Should a particular switch be actuated, then a particular code representing the switch is displayed (Step 210).

DISPLAY OF TIME OF DAY—STEPS 212-222

Once the microcomputer 58 has determined that it is not operating in the self test mode, the microcomputer examines the conduction state of switch 81 to determine whether or not the incoming a.c. supply to the primary of transformer 60 is at 50 or 60 hertz (Step 212). The frequency of the a.c. input voltage is 50 hertz, then, microcomputer 58 a.c. supply voltage is important since the internal timer of microcomputer 58 is clocked in response to the alternations of the a.c. power supply voltage. If frequency of the operates light emitting diode displays 134a and 134b (FIG. 4) as a 24 hour clock (Step 214), assuming that switch 150 has been set to the "24 hour" position. In a location where the frequency of the a.c. supply voltage is 50 hertz, time is usually measured in 24 hour fashion rather than a 12 hour fashion. Following either a determination that the a.c. supply voltage is 60 hertz, or following the operation of the L.E.D. 134a and 134b (FIG. 4) in a 24 hour clock mode, microcomputer 58 checks to see whether or not there are any errors (Step 216), such as a failure to establish values for the total resin bed treating capacity and the incoming water hardness. Detection of an error results in a code indicative of the error being displayed on L.E.D's displays 134a and 134b (Step 218). Otherwise, if no errors are detected, then the microcomputer causes L.E.D. 134b to display the least significant digit of the hour of the day (Step 220) and causes L.E.D. display 134a to display the most significant hour of the day (Step 221).

TIME KEEPING AND FLOW DETECTION—STEPS 222-234

After displaying either the time of day, assuming that no errors exist, or after displaying the error code, the microcomputer then checks the one second count recorded by the internal microcomputer timer (Step 224). When the microcomputer has completed this task, that is to say that the lapse of one second has been recorded by the one second register then, the microcomputer branches to program block A and reloads the one second register (Step 226) as indicated in FIG. 5B. Otherwise, while the microcomputer is waiting for one second to elapse, the microcomputer checks the flow meter (Step 228) by inputting the logic level output voltage of the flow meter. The output logic level voltage of the flow meter is compared to a reference level stored in memory (Step 230). A determination that the logic level voltage produced by the flow meter equals the stored reference value is indicative of the passage of water through the flow meter. In response an internal microcomputer counter storing a count representative of a passage of a certain quantity of water through the flow meter during a given interval is incremented (Step 232) and thereafter, the decimal point segment d.p. of light emitting diode display 134a (FIG. 4) is energized or toggled (Step 234) to indicate water flow through the softener.

POWER LOSS DECTION—STEPS 236-242

Following a determination that the output logic level voltage of the flow meter has not changed states, or following toggling of the L.E.D. display decimal point segment, an internal microcomputer register designated as a "power loss" counter is incremented (Step 236). This register is referred to as a power loss counter because its count continues to be incremented during the period while the microcomputer is awaiting its internal timer to record the lapse of one second. Failure of the power loss counter to be incremented indicates failure of the internal microcomputer timer to record the passage of one second, thus indicating a loss of a.c. power. By checking the count of the power loss counter, (Step 238) a power loss can be detected. If the count of the power loss counter has not been incremented, as determined during Step 238, a power failure has occurred and the microcomputer then blanks the display of light emitting diodes 134a and 134b of FIG. 4 (Step 240) to conserve on power.

After the display has been blanked, the microcomputer checks whether the internal microcomputer timer has resumed counting (Step 242) and continues to check until the internal microcomputer timer records the passage of one second as will normally occur once power is reapplied to the microcomputer. Upon a determination that one second has elapsed, the microcomputer branches to program block A (FIG. 5B) and the one second register is reloaded (Step 226). However, after checking the power loss counter (Step 238), if no power loss has been detected, then the microcomputer branches to Step 222 to recheck the one second register to determine whether or not one second has elapsed.

TIME SETTING—STEPS 244-265

Referring to FIG. 5B, following completion of checking the one second register (Step 224) and reloading of the register (Step 226), the microcomputer determines whether or not the internal microcomputer timer ten second register has counted out the passage of ten seconds (Step 243) after the one second register has been reloaded. If ten seconds have not elapsed, the microcomputer branches to block B and determines whether or not the relay flag has been set (Step 244) as illustrated in FIG. 5C. As will become better understood by reference to the remaining Steps of the program, once the microcomputer determines that regeneration should occur, microcomputer 58 sets a relay flag causing a high logic voltage to appear at microcomputer data bus pin DB7 in response to which, transistor 124 of FIG. 4 is rendered conductive to energize the optical triac 130 of FIG. 4. The optical triac then energizes motor 48 (FIG. 2) to drive cam shaft 28 (FIGS. 1 and 2) to initiate regeneration. After regeneration is initiated by setting of the relay flag, the relay flag remains set for ten minutes to assure that the optical triac keeps motor 48 of FIG. 2 energized. Once the motor has been energized to drive the cam shaft 28 of FIGS. 1 and 2 via gears 46, 44 and 32, the switch 57 is kept closed by the rotation of the gears to keep the motor energized well after the 10 minutes has elapsed so that the entire regeneration cycle, which usually takes between 1-2 hours will be completed.

Returning to FIG. 5C, if the relay flag has been set, or is "on" the microcomputer makes sure that the relay flag has been set (Step 246) before determining whether or not switch 79 of FIG. 4 has been closed (Step 248) to set the time displayed by light emitting diodes 134a and 134b of FIG. 4. Alternatively, the microcomputer makes sure that after having not detected a set relay flag, that no flag was in fact set (Step 250) before checking to see whether switch 79 is closed to alter the displayed time (Step 248).

Following the determination that switch 79 has been closed to set the time display by the light emitting diodes 134a and 134b of FIG. 4, the microcomputer then clears the internal microcomputer timer one second registers recording the number of elapsed seconds (Step 252). Thereafter the microcomputer then clears the timer ten second register recording the number of ten second intervals that have elapsed (Step 254). Next, the microcomputer clears the register recording the number of 60 second or one minute intervals that have elapsed (Step 256) before the microcomputer increments the register of the internal microcomputer timer which records the passage of hours (Step 258).

Upon incrementation of the hour-register of the internal microcomputer timer, a "flash" flag is reset (Step 260) before clearing the register storing the error codes (Step 262). The purpose of the flash flag will be explained below. After, either the microcomputer has cleared the error code register (Step 262) or after the computer has determined that the time switch 79 of FIG. 4 has not been closed (Step 248), the microcomputer determines whether the flash flag has been set (Step 264). During execution of the presently described program, an internal flag within the microcomputer referred to as the "flash flag" is alternately set and reset every second. As will become clear immediately hereinafter, the alternation of the state of the flash flag causes the display of light emitting diodes 134a and 134b to flash on and off during alternate seconds. A determination that the flash flag was unset when checked during Step 264, causes the microcomputer 58 to execute a jump instruction (Step 265) to branch to program block C so that Step 216 is re-executed after which either the appropriate error code is displayed (Step 218) or if no error exists, then the time of day is displayed on L.E.D. 134a and 134b of FIG. 4 (Steps 220 and 221). However a determination that the flash flag is set, causes the microcomputer 58 to check to see whether another flag, referred to as the "alter flag", has been set (Step 266). This flag is set each time the time of day data to be displayed by the light emitting diodes has been altered or changed as will occur when the hour of the day has changed. When the alter flag has been set, then the altered time of day data to be displayed, is stored in microcomputer memory in place of the previous time of day data (Step 268) and jump Step 265 is then executed so that program control branches to Step 216. If the alter flag has not been set, then the time of day data is stored (Step 270) in a section of memory other than that associated with the data to be displayed on the light emitting diode display and data representing a blank display is moved into the memory location where the time of day to be displayed is usually stored (Step 272) before jump Step 265 is executed. When data represented a blank is stored in this memory location of the microcomputer memory, and when steps 220 and 222 are executed, neither of light emittng diode displays 134a and 134b are energized, so as to effectively display a blank.

WATER FLOW CALCULATION AND TIME UPDATE—STEPS 274-298

Returning now to FIG. 5B, when the internal microcomputer timer has in fact counted ten seconds, then the program branches to Step 274 after the ten second register has counted out rather than to Step 244 as was described previously. Upon execution of Step 274, the microcomputer increments the ten second register. Following incrementation of the ten second register, the previously stored count representing the number of transitions of the logic level of the flowmeter output voltage is converted into gallons (Step 276). This is accomplished by multiplying the flowmeter output voltage transition count by a constant. The constant is actually a conversion factor which equals the number of gallons flowing past the flowmeter during the interval between each transition of the flowmeter output voltage. The calculated amount of soft water that left the softener during the 10 second interval is added to the previously calculated daily volume of soft water already stored in memory (Step 278) to keep an ongoing record of the amount of soft water passing through the softener for that day. Thereafter, the microcomputer checks whether the ten second counter has counted out six times thus indicating the passage of a minute (Step 280). If the ten second timer has not counted out six times, then the microcomputer jumps to program block B to re-execute Step 244 and those following it described previously to make sure that the relay flag is set or not set and then to cause the time of day to be flashed on the L.E.D.'s 134a and 134b of FIG. 4.

When, however, the ten second register of the internal microcomputer timer has in fact counted out six times indicating the passage of a minute, then the microcomputer checks the 60 minute register to determine whether or not the number of minutes that have been counted equals sixty (Step 282) indicating the passage of an hour. The microcomputer will execute a jump instruction (Step 283) to branch to block B of the program if an hour has not elapsed so that the microcomputer commences re-execution of Step 244. Otherwise, if the number of minutes counted does equal sixty, then the hour register which counts the number of hours that have elapsed is incremented by one (Step 285).

Following incrementation of the hour register the microcomputer then determines whether or not the particular time of day as determined by the count of the hour counter is 2:00 a.m. (Step 286) so that the microcomputer can determine whether or not regeneration should occur at this off-hour. Should the time not be 2:00 a.m., then the microcomputer checkes the count of the hour register to determine whether or not the count of the hour register is twelve which would indicate a time of either 12:00 noon or 12:00 midnight (Step 288). Upon a determination that the count of the hour counter was 12, the microcomputer then checks whether or not the decimal point segment d.p. of light emitting diode 134a of FIG. 4 was previously energized (Step 290). If, at the time the count of the hour register equals 12 the microcomputer has determined that the decimal point segment d.p. of L.E.D. 134a of FIG. 4 was previously on, indicating that the time of day was after 11:00 p.m. but before 12:00 midnight, then the decimal point segment d.p. is turned off (Step 292) indicating that the time is now after midnight and before noon. However, if the decimal point segment d.p. of the light emitting diode 134a had previously been off or deenergized before the count of the hour register reached twelve, then after the hour counter has counted twelve, the decimal point segment d.p. of light emitting diode display 134a is turned on (Step 294) to indicate that the time is now post meridian rather than antemeridian.

When the microcomputer has determined that the hour register has not counted twelve during Step 288, then, the hour register is checked to determine whether or not the number of hours counted equals thirteen (Step 296). A count of 13 requires that the number of hours counted by the hour register be reset to one (Step 298) before the program executes jump instruction 299 to branch to program block B to re-execute Step 244. Otherwise if the count of the hour register is other than thirteen, then the program executes jump instruction 299 to branch to Step 244 directly without resetting of the hours register.

DECIDE IF REGENERATION IS REQUIRED—STEPS 286-332

Figure 5D:
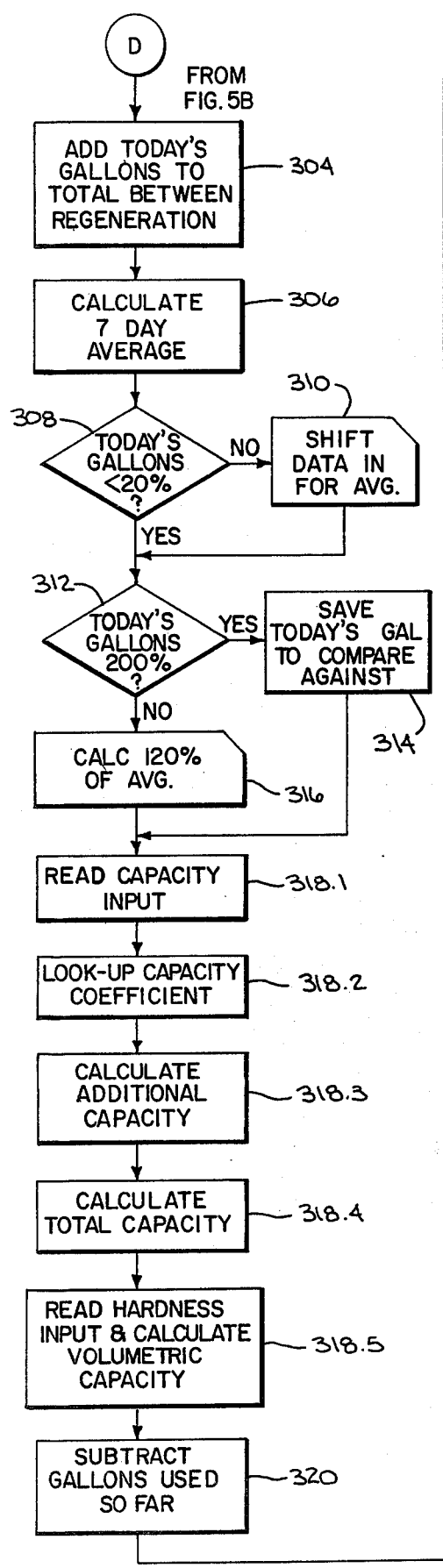
Figure 5D:
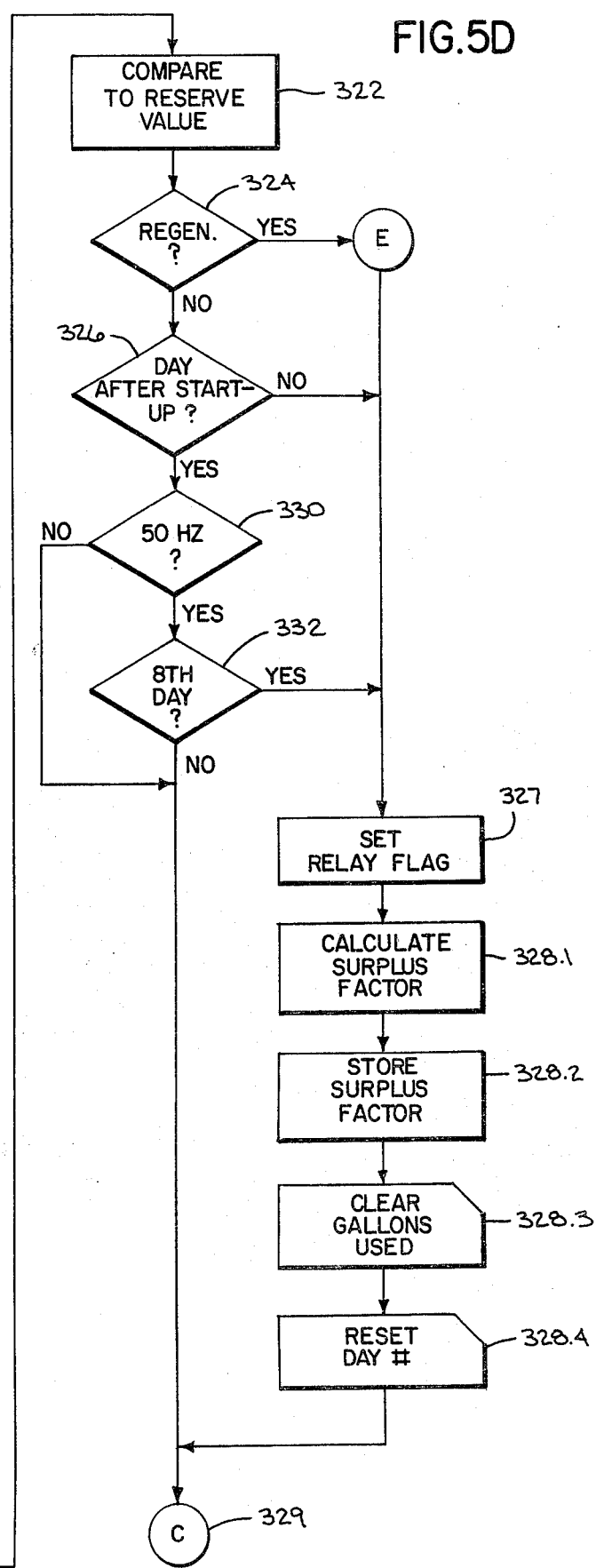

Should the microcomputer determine during execution of Step 286 that the time of day is 2:00 a.m. or such other off-hour time as designated for regeneration, then the microcomputer proceeds to determine whether or not regeneration should occur by branching to block D and executing the following Steps illustrated in flow chart form in FIG. 5D. First, the total number of gallons used during elapsed 24 hour period, as determined during execution of Steps 260-264, are added to the total number of gallons used since previous regeneration (Step 304). Thereafter, the average daily amount of soft water used over the past seven days (excluding the just elapsed day) is calculated (Step 306) by summing the seven separate values which each represent the soft water consumption for each of the past seven days and then dividing the total sum by seven. Once the average of the daily comsumption of soft water is calculated, this average value is compared to the previous day's total consumption (Step 308). If the previous day's consumption is greater than 20% of the average daily consumption, then the previous day's usage is stored in memory as the amount of water consumed for that day causing each of the daily stored values of the water consumption to be shifted in memory to now represent one earlier day's usage (Step 310) before proceeding to the next Step. Note that the earliest day's usage will be erased. However, when the previous day's usage is less than 20% of the average daily consumption, then the amount of water used during the previous day is stored to enable it to be added to the total amount of water used between regenerations during the next execution of the program, but the previous day's consumption is not stored in memory as the amount of soft water consumed during that day so that no data shifting occurs. In this way, an unusually low daily consumption of soft water is ignored to avoid a zero average daily consumption of soft water such as might occur during intervals of non usage such as during vacations.

Following execution of Step 310, or following execution of Step 308 if the consumption for a given day is less than 20% of the average daily consumption, the microcomputer then checks whether or not the previous day's consumption was greater than 200% of the average daily consumption (Step 312). Should the previous day's consumption of soft water be 200% greater than the seven day average consumption of soft water due to a sudden increase in water consumption which may result from the arrival of weekend guests for example, then this previous day's usage is stored in memory as a reserve value (Step 314). This reserve value represents the total amount of soft water likely to be consumed during the next 24 hour interval before the microcomputer will again make a determination as to whether or not regeneration is necessary. Otherwise the reserve value is determined as a percentage of the calculated seven day average (Step 316). Typically, if the previous day's consumption is less than 200% of the calculated average, the reserve calculated during Step 312 is obtained by multiplying the seven day average by 1.2.

After the reserve is established, either during execution of Step 314 or Step 316, depending whether the previous day's consumption was greater than or less than 200% of the calculated seven day average, respectively, then the microcomputer 58 proceeds to calculate the total treating capacity of the resin bed 14 in gallons by executing Steps 318.1–318.5. First, the input resin bed treating capacity, as measured in grains, is read (Step 318.1). As will be recalled from the discussion of the control circuit 50 of FIG. 4, the capacity data is input to the microcomputer 58 by connecting the jumper from the microcomputer port pin $P_{16}$ to one or more of the data bus pins $DB_0$–$DB_5$ and port pins $P_{20}$–$P_{23}$. The input capacity value is equal to the resin bed capacity when the resin bed is totally exhausted and then regenerated. To account for the additional capacity resulting from the regeneration of a partially exhausted resin bed, an additional amount of capacity, proportional to the variable referred to as the surplus factor, is added to the input capacity value. The surplus factor is defined as the ratio of the remaining capacity (in gallons) when a regeneration is initiated to the total adjusted resin bed capacity. As will become better understood following a complete description of the flow chart of FIG. 5D, each time a regeneration is initiated, a new value for the surplus factor is calculated and stored for future use so that the most current value of the surplus factor is proportional to the current additional capacity created upon regeneration of a partially exhausted resin bed.

Following execution to Step 318.1, the surplus factor is utilized to look up a capacity coefficient value stored in tabulated form in the microcomputer 58 read only memory (Step 318.2). As described previously, each capacity coefficient value is proportional to the increased capacity attributed to regeneration of a partially exhausted resin bed with a particular regnerant level. The capacity coefficient values are nonlinear and are determined empirically based on the type of resin employed and the water conditions. Next, the additional capacity is calculated (Step 318.3) by multiplying the input capacity obtained during Step 318.1 by the capacity coefficient value obtained during Step 318.2. After calculating the additional capacity (Step 318.3) the total capacity is calculated (Step 318.4) by adding the additional capacity calculated during Step 318.3 to the input capacity obtained in Step 318.1. The total capacity value calculated during Step 318.4, which is measured in grains, must be converted into gallons in order to enable the remaining capacity to be calculated. To convert the capacity value calculated during Step 318.4 into gallons, the water hardness, as measured in grains/gallons is first read (Step 318.5). As will be recalled, the water hardness is input to the microcomputer 58 by connecting each of the jumpers from the microcomputer port pins $P_{15}$ and $P_{16}$ to a selected one of the data bus pins $DB_0$–$DB_5$ and port pins $P_{20}$–$P_{23}$. Once the water hardness is read by the microcomputer, the total adjusted capacity value calculated during Step 318.4 is divided by the water hardness to yield the total adjusted capacity, as measured in gallons.

After the adjusted total water softener resin bed treating capacity has been calculated (Step 318.5), the quantity of water consumed since the last regeneration is subtracted from the adjusted total resin bed treating capacity (Step 320) to yield a value representing the remaining water softener resin bed treating capacity. The value representing the remaining water softener treating capacity is then compared (Step 322) to the reserve value previously calculated during Step 314 or Step 316. Following comparison of the reserve value to the calculated value representing the remaining water softener resin bed treating capacity, the microcomputer 58 then determines whether or not regeneration should occur (Step 324). If the reserve value, as previously calculated during either Step 314 or Step 316, is greater than the remaining water softener resin bed capacity, so that it is highly improbable that the water softener resin bed would have sufficient capacity to treat the amount of water likely to be consumed during the next 24 hour interval, then regeneration is effected by following branch E to Step 327 to cause the relay flag to be set and motor 48 of FIGS. 1 and 2 to be energized. Otherwise, the remaining water softener resin bed treating capacity calculated during Step 320 is greater than the reserve calculated during either of Steps 314 or 316 and thus no regeneration need be effected. Then, the microcomputer 58 checks whether or not the particular day of the week is the first day following a start up after a power failure (Step 326). If the day happens to be the first day following start up after a power failure, then the microcomputer 58 follows branch E to Step 327 to set the relay flag which causes the energization of motors 48 of FIGS. 1 and 2. This way, regeneration always occurs after the first day after a power failure to assure that soft water always leaves a softener which may not otherwise occur if a large quantity of soft water is consumed during the power failure.

Following execution of Step 327 and setting of the relay flag, the microcomputer 58 calculates a new value for the surplus factor (Step 328.1). To calculate the new value for the surplus factor, the microcomputer 58 divides the remaining capacity, previously calculated during Step 320 by the total volume metric capacity (previously calculated during Step 318.5). Following calculation of the new value for the surplus factor, the newly calculated value is stored in memory (Step 328.2) at the location where the previously calculated surplus factor was stored to overwrite the old value thus replacing any previously stored value including the default value of zero placed in the memory during Step 204. Following Step 328.2, the memory location within the internal memory of microcomputer 58 storing the data representing the number of gallons used since the previous regeneration is cleared (Step 328.3). Once this memory location has been cleared, the microcomputer 58 resets the register which records the number of days between the regeneration intervals (Step 328.4). Thereafter, the microcomputer 58 executes jump instruction 329 to follow branch C to Step 216 of FIG. 5A.

If, however, more than one day has elapsed since the start up of the microcomputer 58 following a power failure, then the microcomputer 58 branches to Step 330 during which the microcomputer checks whether the frquency of the incoming power is 50 Hz. If the frequency of the incoming power is 50 Hz, then the microcomputer 58 checks whether 8 days have elapsed since the last regeneration (Step 322). Should the count of the register recording the number of days since regeneration be 8 or greater, indicating that 8 or more days have elapsed since the previous regeneration, then the microcomputer follows branch E to Step 327 which, when executed initiates water softener resin bed regeneration. In this way, regeneration is automatically effected every 8 days if no previous regenerations have occurred as is sometimes required by the health laws of countries foreign to the United States.

When the microcomputer 58 has determined that the frequency of the incoming power is not 50 Hz, or that if the power frequency is 50 Hz but 8 days have not yet elapsed since the previous regeneration, then the microcomputer 58 executes jump instruction 329 to follow branch C to Step 216.

Execution of the above described program occurs continuously during operation of the water softener without any need for manual intervention. Once the initial data of the water softener resin bed refining capacity (in kilograins) and the incoming water hardness (in grains per gallon) is entered into the microcomputer 58 memory, no further adjustments need to be made. Even a power outage will not totally prevent execution of the internal microcomputer 58 program controlling the water softener although it is necessary for power to be resumed in order for the control circuit 50 to effectively control water softener regeneration.

Although the control circuit of the present invention has been described for use with a resin bed water softener, it is equally useful for controlling other types of water treatment devices having a filter bed requiring periodic regeneration.

The foregoing describes an improved control circuit for a water softener for controlling regeneration of a water softener resin bed in accordance with the actual average daily consumption so as to prevent the water softener from regenerating too often or not often enough.

While only certain preferred features of the invention have been shown by way of illustration, many modifications and changes will occur to those skilled in the art. It is, therefore, to be understood that the appended claims are intended to cover all such modifications and changes as will fall within the true spirit of the invention.

What is claimed is:

1. A control for a water treatment device having a particle bed requiring periodic regeneration and including a flowmeter for measuring the quantity of treated water leaving the particle bed and a data entry device for entering input capacity data indicative of the amount of water treatable by the particle bed until the particle bed is completely exhausted, the improvement comprising:
   a controller for controlling regeneration of the particle bed, the controller including:
      memory means for storing said input capacity data and for storing remaining capacity data indicative of the remaining particle bed treating capacity prior to regeneration;
      calculating means for calculating
         (i) a reserve value representing the anticipated volume of soft water likely to be used prior to the next regeneration interval, said reserve value calculated in accordance with the treated water consumed as measured by said flowmeter,
         (ii) the total adjusted treating capacity of the particle bed, said total adjusted treating capacity calculated in accordance with the input capacity data and said remaining capacity data,
         (iii) the remaining particle bed capacity in accordance with the difference between the total adjusted treating capacity value and the quantity of treated water leaving the particle bed since the previous regeneration, as measured by said flowmeter, said remaining capacity value stored in said memory and overwriting the previously stored remaining capacity data; and
      logic means for initiating regeneration of the water treatment device particle bed at a predetermined time each day if the reserve calculated by said controller calculating means exceeds the remaining capacity value calculated by said controller calculating means.

2. The invention according to claim 1 wherein said controller means comprises a microcomputer.

3. A method for controlling a water treatment device having a particle bed requiring periodic regeneration comprising the steps of:
   (a) measuring the quantity of water leaving the water treatment device particle bed over a period of time;
   (b) periodically determining the actual quantity of treated water consumed and establishing a reserve value representative of the amount of water likely to be consumed prior to the next regeneration in accordance with the amount of treated water leaving the water treatment device during the period;
   (c) determining a total capacity value representative of the quantity of water treatable by the water treatment device until the water treatment device particle bed becomes completely exhausted;

(d) adjusting the total capacity value to account for the increased capacity created when a partially exhausted particle bed is regenerated;

(e) calculating the remaining water treatment device particle bed treating capacity in accordance with the difference between the total capacity value, as adjusted for the increased capacity created when a partially exhausted particle bed is regenerated, and the quantity of water that has left the softener since the previous regeneration; and (f) initiating regeneration of the particle bed at a predetermined time if the calculated remaining treated capacity is less than the established reserve value.

4. The method according to claim 3 wherein the Step of adjusting the total capacity value to account for the increased capacity created if a partially exhausted resin bed is regenerated comprises the steps of:

(a) calculating the increased capacity created when a partially exhausted particle bed is regenerated, said calculation being made in accordance with the remaining particle bed treating capacity prior to regeneration; and (b) adding the calculated additional water treatment device particle bed capacity created when a partially exhausted particle bed is regenerated to the total capacity value representing the quantity of water treatable by the particle bed until the particle bed becomes fully exhausted.

5. The method according to claim 4 wherein said Step of calculating the additional particle bed treating capacity created when a partially exhausted particle bed is regenerated comprises the Steps of:

calculating a surplus factor value in accordance with the ratio $$\text{Surplus factor value} = \frac{\text{Remaining capacity}}{\text{Adjusted total capacity}};$$

(b) obtaining a capacity coefficient value which is proportional to the increased capacity created when a partially exhausted resin bed is regenerated with a particular regenerant level, said capacity coefficient value being obtained in accordance with the said surplus factor value; and (c) determining the additional particle bed treating capacity created when a partially exhausted particle bed is regenerated in accordance with the product of the capacity coefficient value and the input capacity value.

6. A control for a water treatment device having a particle bed requiring periodic regeneration including a flowmeter for measuring the volume of flow of treated water leaving the water treatment device and a data entry device for entering input capacity data indicative of the total quantity of water treatable by the water treatment device until the particle bed is completely exhausted, the improvement comprising:

a controller for controlling the water softener to initiate regeneration, said controller including:

a timer for measuring time;

a memory for storing data indicative of the quantity of treated water consumed over a period of time in accordance with the flow measured by said flowmeter and for storing a table of coefficient values, each coefficient value being proportional to the additional particle bed treating capacity created when a partially exhausted particle bed is regenerated with a particular regenerant level; and a central processor coupled to said timer and said memory for determining the actual average daily quantity of soft water used over a period of several days and establishing a soft water reserve value indicative of the amount of soft water likely to be consumed prior to the next possible regeneration in proportion to the actual average daily quantity of soft water consumed, said central processor coupled to said data input device for reading the input capacity data and for adjusting the input capacity data in accordance with a selected one of said coefficient capacity values selected in accordance with the previously calculated remaining particle bed treating capacity, said central processor calculating and storing a new value for the remaining resin bed capacity in accordance with the difference between the adjusted total capacity value and the quantity of water consumed since the previous regeneration and said controller initiating regeneration of the particle bed with the newly calculated remaining particle bed treating capacity less than the established reserve quantity.

* * * * *

UNITED STATES PATENT AND TRADEMARK OFFICE
CERTIFICATE OF CORRECTION

PATENT NO. : 4,470,911
DATED : September 11, 1984
INVENTOR(S) : John F. Reinke

It is certified that error appears in the above-identified patent and that said Letters Patent is hereby corrected as shown below:

Col. 11, line 11, "Zener diode 34" should be --Zener diode 84--.
Col. 17, line 30 "DECTION" should be --DETECTION--.
Col. 18, line 24, "1-2 hours" should be --1-2 hours,--.
Col. 19, line 19, "day to be" should be --day data to be--.
Col. 19, line 23, "emittng" should be --emitting--.
Col. 20, line 9, "checkes" should be --checks--.
Col. 22, line 7, "regnerant" should be --regenerant--.
Col. 23, line 27, "frquency" should be --frequency--.

Col. 25, line 33, "calculating a surplus" should read --(a) calculating a surplus--.

Signed and Sealed this

Twenty-seventh Day of August 1985

[SEAL]

Attest:

DONALD J. QUIGG

Attesting Officer  Acting Commissioner of Patents and Trademarks